July 25, 1950 B. A. LUNDY 2,516,400

SWITCH CIRCUIT CONTROLLING DEVICE FOR RAILROADS

Filed Aug. 25, 1945

Inventor

B. A. Lundy,

By

Neil W. Preston, his Attorney

Patented July 25, 1950

2,516,400

UNITED STATES PATENT OFFICE 2,516,400

SWITCH CIRCUIT CONTROLLING DEVICE FOR RAILROADS

Beverly A. Lundy, New York, N. Y., assignor to General Railway Signal Company, Rochester, N. Y.

Application August 25, 1945, Serial No. 612,583

4 Claims. (Cl. 246—253)

Figure 1:
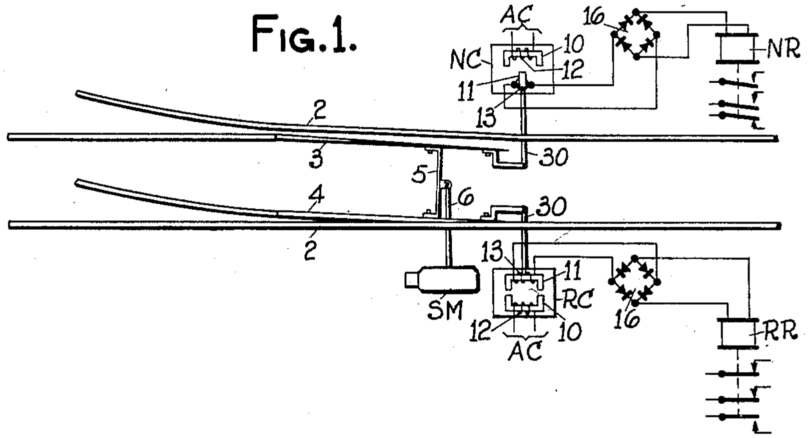

This invention relates to circuit controlling devices associated with the movable switch points of track switches on railroads for governing electrical circuits dependent upon the position of the switch points.

In connection with controlling the indications governing train movement over track switches on railroads, and for similar purposes, it is desirable to have a suitable circuit controlling device which will open or close electrical circuits when the switch points of a track switch are displaced to a small extent from their extreme normal or reverse positions. One type of device, suitable for this purpose, and commonly known as a switch box or switch circuit controller, employs contacts in a suitable housing mounted on the ties of adjacent switch points, and a suitable cam and roller or equivalent operating means for actuating these contacts is mechanically connected to the switch points, so that appropriate contacts are opened or closed when the switch points are slightly displaced from the full normal or reverse position. In this type of mechanical switch circuit controller, satisfactory contact operation depends upon accurate adjustment of the various mechanical connections, and these contacts on account of their location, are also subject to the condensation of moisture and accumulation of frost under changing weather conditions, and severe shock and vibration caused by passing trains.

In view of these and other well known limitations of the conventional mechanical switch circuit controller, it is proposed in accordance with this invention, generally speaking and without attempting to define the nature and scope of the invention, to employ conventional relay structures to perform the circuit controlling functions, and to govern the energization of such a relay by changing the inductive coupling of an electromagnetic structure, without any contacts, which is located in a suitable housing on the ties adjacent the switch points, and which is mechanically connected to the switch points to obtain the desired relative motion for control of the inductive coupling. Stated more specifically, it is proposed to provide relatively movable magnetic cores and associated windings, operable to positions of maximum and minimum inductive coupling, which control the supply of energy from a suitable source of alternating current to a conventional relay through a suitable rectifier, so that when the switch points are displaced, the resultant change in the inductive coupling causes effective deenergization of the relay and operation of its contacts to provide the desired control of signalling circuits.

Various other characteristic features, attributes, and advantages of the invention will be in part apparent, and in part pointed out as the description progresses.

In describing the invention in detail, reference will be made to the accompanying drawings which illustrate in a simplified and diagrammatic manner one specific electrical and mechanical organization embodying the invention, the parts and circuit connections being shown in these drawings more for the purpose of facilitating an explanation and understanding of the invention, than to illustrate the detail constructions preferably employed in practice.

Figure 2:
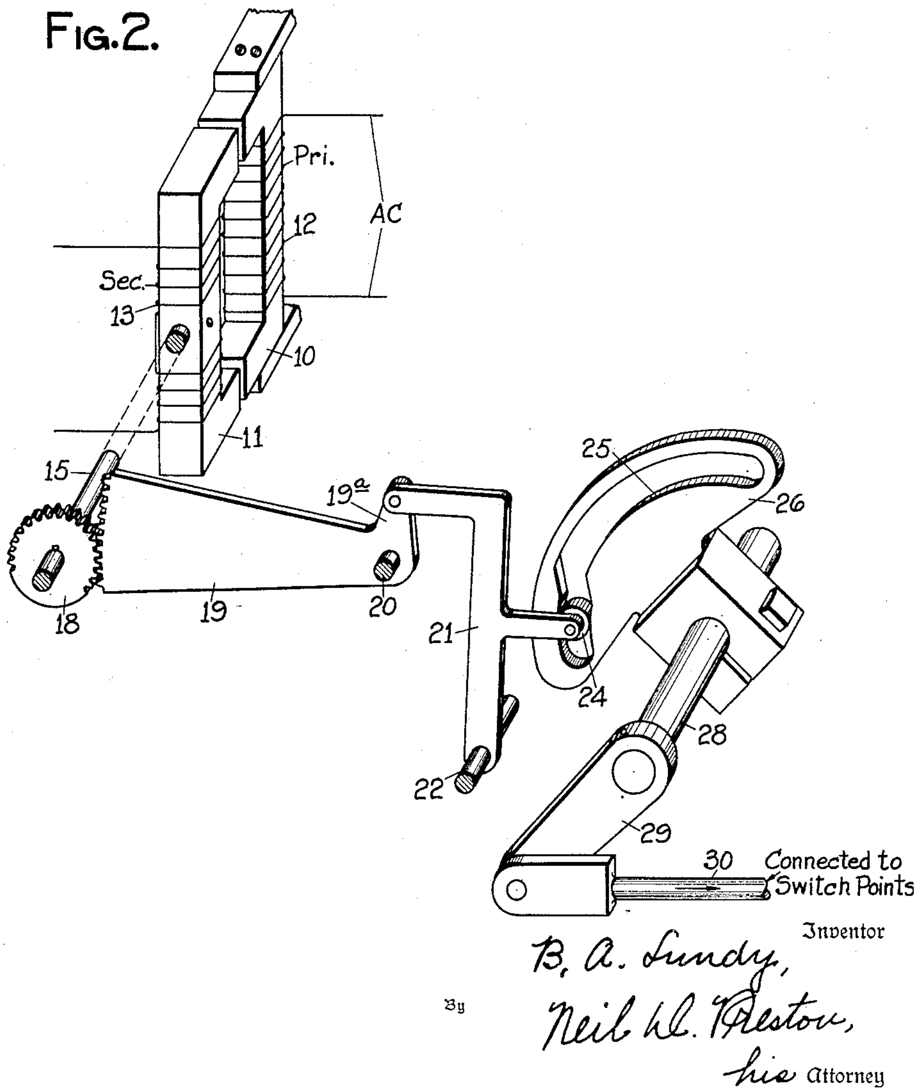

In the accompanying drawings, Fig. 1 illustrates diagrammatically one embodiment of the invention applied to the switch points of a conventional single switch; and Fig. 2 illustrates in perspective one type of operating means preferably employed for changing the inductive coupling characteristic of this invention.

Referring to Fig. 1, the usual stock rails 2 and movable switch points 3, 4 are shown in a simplified and conventional manner, with the movable switch points 3, 4 connected by the usual front rod 5 which in turn is connected by a throw rod 6 to a suitable operating means, assumed to be the usual type of power operated switch machine SM. The movable switch points 3, 4 have two extreme positions, commonly known as the normal and the reverse positions, in which the track is aligned for a straight through movement, or a turn-out movement, respectively, the switch points being illustrated as a matter of convenience in the reverse position.

Connected to the switch points 3, 4 are two circuit controlling devices designated generally NC and RC, each constructed in accordance with this invention, to detect the position of the switch points, in the same manner and for the same purpose as the conventional switch circuit controller. Since these circuit controlling devices NC and RC of this invention, associated with the respective switch points, are alike in construction and operation, a description of one will serve both.

In the specific form of the invention shown, the variable inductive coupling characterizing this invention is obtained by providing two relatively movable magnetic cores 10 and 11, preferably U-shaped, each having thereon a coil or winding 12 and 13. These two movable cores and their windings are in effect the primary and secondary portions of a transformer which may be moved relatively to provide a maximum and a minimum inductive coupling between the primary and secondary windings. One of these cores 10 and its associated winding 12, which may be considered to be the primary element, is suitably fastened in position in a suitable housing (not shown); and the other secondary core 11 is mounted on a shaft 15 so that it can be turned from the maximum coupling position shown in Fig. 2 through an angle of approximately 90° to a minimum coupling position shown for the upper device NC in Fig. 1.

The primary winding 12 is connected to a suitable source of alternating current designated AC, and assumed to be of the usual commercial frequency available on railroads, although it is contemplated that, if desired, suitable vacuum oscillators, or other suitable generators of alternating current of a higher frequency may be used. The other secondary winding 13 is connected through a conventional full wave rectifier 16, shown conventionally and assumed to be of the dry-plate or copper-oxide type, to the winding of a conventional direct current relay NR or RR having its contact fingers biased by gravity or a spring to the retracted position in accordance with usual practice.

The movable secondary core 11 and its winding 13 may be operated from the maximum coupling position to the minimum coupling position in response to a slight movement of the switch points from a corresponding extreme position by any suitable means. In the simplified organization illustrated schematically in Fig. 2, a gear 18 fixed on the shaft 15 supporting this secondary core and its winding meshes with a gear sector 19 pivotally supported on a suitable pin or shaft 20. An extending arm 19*a* on this gear sector 19 is connected to the upper end of an operating lever 21, pivotally supported at its lower end by a suitable pin or shaft 22. This operating lever 21 carries on an extending arm a freely rotatable roller 24 engaging a cam slot 25 formed in a sector-shaped operating member 26, so that a slight rocking movement of this member 26 counter-clockwise from the position shown shifts the roller 24, lever 21 and the gear sector 19 sufficiently to move the secondary core 11 to its minimum coupling position. The cam slot 25 is shaped so that further movement of the operating sector 26 holds this secondary core 11 in this coupling position.

The operating sector 26 is rigidly held in an adjustable clamped position on a shaft 28 supported on suitable bearings (not shown) to which a crank arm 29 is fixed; and this crank arm 29 is connected by an operating rod 30 and suitable adjustable fittings (not shown) in the usual way to the associated switch points 3 or 4.

When the switch points are in one extreme position, such as the reverse position shown in Fig. 1, the movable magnetic cores 10 and 11 and their windings 12 and 13 for the corresponding device RC are in the maximum coupling position, and sufficient energy is transferred from the source of alternating current AC and by transformer action through the two windings on these movable cores, through the rectifier 16 to provide the normal effective energizing current for the associated reverse relay RR. The relatively movable cores 10, 11 and associated windings 12, 13 for the other device NC connected to the other switch point 3 are in the minimum coupling position, so that the associated normal relay NR is deenergized.

If the switch points fail to assume the full normal or reverse position, or are displaced from such existing position, the cores and windings then in the maximum coupling position are quickly moved to the minimum coupling position to deenergize the associated relay. Thus, if the switch points are not in the proper normal or reverse position, both of the normal and reverse relays NR and RR are deenergized, but if the switch points are in normal position, the normal relay NR is energized and the reverse relay RR deenergized, while if in the reverse position, the reverse relay RR is energized and the normal relay NR deenergized.

In this way, the normal and reverse relays NR and RR are energized and deenergized in a simple and effective manner to provide the desired control of the signalling circuits by opening and closing contacts as may be required. Since these relays may be supported and housed at any convenient location, in accordance with recognized practice, they must be protected against faulty contact operation by vibration, condensation of moisture and the like, to a better advantage than the contacts of a conventional switch circuit controller mounted close to the switch points.

The parts of the circuit controlling device of the invention, disposed in the box or casing on the ties adjacent the switch point, merely involve mechanical movement, and can be so constructed that their proper functioning is not disturbed by the vibration of a passing train, or by accumulation of moisture, or the like inside their enclosing housing.

The particular embodiment of the invention shown and described is merely illustrative of the nature and the character of the invention; and it should be understood that various modifications, adaptations, and additions may be made to the particular parts and circuits shown without departing from the invention.

What I claim is:

1. A switch circuit controlling device for detecting the position of the movable points of a railway track switch comprising in combination, a fixed electromagnetic structure having a winding and a movable electromagnetic structure having a winding, a crank shaft rotated by the movement of the track switch, an adjustable cam on said crank shaft, actuating means for said movable electromagnetic structure operable by said cam in accordance with the rotation of said crank shaft to an extent to actuate said movable electromagnetic structure selectively from a position providing maximum magnetic coupling with said fixed electromagnetic structure to a position providing minimum magnetic coupling with said fixed electromagnetic structure in accordance with a small movement of the track switch within operating limits that are safe for facing point traffic over the track switch along a particular route, a source of alternating current connected to one of said windings, a rectifier, a relay, and circuit means connecting said relay to the other of said windings through said rectifier.

2. A switch circuit controlling device for detecting the integrity of a route over a track switch comprising in combination, a fixed electromagnetic structure having a winding, a movable electromagnetic structure having a winding, a crank shaft rotatively coupled to the track switch, an adjustable cam on said crank shaft, actuating means for said movable electromagnetic structure operated by said cam and effective to actuate said movable electromagnetic structure selectively between points of maximum and minimum inductive coupling with said fixed electromagnetic structure in accordance with a small movement of the track switch within operating limits that are safe for facing point traffic along said route over the track switch, a source of alternating current, a rectifier, a direct current relay, circuit means for energizing the winding of one of said electromagnetic structures from said source, and circuit means for connecting the winding of the other of said electromagnetic structures through said rectifier to said relay, whereby said relay is selectively picked up or dropped away in accordance with the degree of energization of said other electromagnetic structure by voltage induced from said one magnetic structure so as to indicate the integrity of said route over said track switch.

3. Circuit controlling means for checking the integrity of routes over a track switch in its respective normal and reverse positions comprising in combination, adjustable cams for the respective normal and reverse positions of the track switch, means for rotating each of said cams in accordance with the operation of said track switch, a fixed electromagnetic structure for each of said cams having a winding, a movable electromagnetic structure for each of said cams having a winding, and actuating means for each of said movable electromagnetic structures operated by the associated cam and effective to actuate that movable electromagnetic structure selectively between points of maximum and minimum inductive coupling with the associated fixed electromagnetic structure in accordance with movement of the track switch within operating limits that are safe for train movement when the track switch is in its particular position for which that cam is provided.

4. Circuit controlling means for checking the integrity of routes over a track switch in its respective normal and reverse positions comprising, adjustable cams for the respective normal and reverse positions of the track switch, means for rotating each of said cams in accordance with the movement of the track switch, a fixed electromagnetic structure for each of said cams, a movable electromagnetic structure for each of said cams, actuating means for actuating each of said movable electromagnetic structures by its associated cam provided the track switch is in the position for which that cam is provided, said actuating means being effective to selectively actuate its associated movable electromagnetic structure between points of maximum and minimum inductive coupling with the associated fixed electromagnetic structure in accordance with movement of the track switch within operating limits that are safe for train operation, a source of alternating current, a rectifier for each of said cams, a direct current relay for each of said cams, circuit means for energizing one of said electromagnetic structures that is associated with each cam from said source of alternating current, and circuit means for connecting the other of said electromagnetic structures that is associated with each cam through said rectifier for that cam to said relay for that cam, whereby each relay is selectively picked up or dropped away in accordance with the degree of energization of its associated movable electromagnetic structure.

BEVERLY A. LUNDY.

REFERENCES CITED

The following references are of record in the file of this patent:

UNITED STATES PATENTS

| Number | Name | Date |
|---|---|---|
| 1,101,036 | Oler | June 23, 1914 |
| 1,413,820 | Zabel | Apr. 25, 1922 |
| 1,561,962 | Whitney | Nov. 17, 1925 |

FOREIGN PATENTS

| Number | Country | Date |
|---|---|---|
| 173,381 | Great Britain | Jan. 5, 1922 |